United States Patent [19]
Randon

[11] Patent Number: 5,832,658
[45] Date of Patent: Nov. 10, 1998

[54] SYSTEM AND APPARATUS FOR DETECTING AND MONITORING THE PRESENCE OF WOOD-DESTROYING INSECTS

[75] Inventor: Donald G. Randon, Gretna, La.

[73] Assignees: Louisiana Landscape Specialty, Inc., Gretna; Carver, Darden, Koretzky, Tessier, Finn, Blossman & Areaux L.L.C., New Orleans, both of La.

[21] Appl. No.: 728,204

[22] Filed: Oct. 10, 1996

[51] Int. Cl.[6] .................................................. A01M 1/20
[52] U.S. Cl. ............................. 43/131; 43/124; 43/132.1
[58] Field of Search ......................... 43/124, 131, 132.1

[56] References Cited

U.S. PATENT DOCUMENTS

| | | | |
|---|---|---|---|
| 213,235 | 3/1879 | Mueller | 43/124 |
| 478,691 | 7/1892 | De Shon | 43/131 |
| 1,394,497 | 10/1921 | Heller | 43/131 |
| 1,448,236 | 3/1923 | Riney | 43/131 |
| 1,471,954 | 10/1923 | Greenway | 43/131 |
| 1,700,517 | 1/1929 | Ross | 43/131 |
| 2,837,861 | 6/1958 | Graham, Sr. | 43/131 |
| 2,999,642 | 9/1961 | Stone | 43/124 |
| 3,303,599 | 2/1967 | Ballard | 43/131 |
| 3,304,646 | 2/1967 | Staley | 43/131 |
| 3,772,820 | 11/1973 | Bond | 43/131 |
| 3,940,875 | 3/1976 | Basile | 43/131 |
| 4,021,965 | 5/1977 | Norris | 43/131 |
| 4,251,946 | 2/1981 | Lindley | 43/131 |
| 4,462,182 | 7/1984 | French | 43/131 |
| 4,485,582 | 12/1984 | Morris | 43/131 |
| 4,858,374 | 8/1989 | Clemons | 43/122 |
| 5,329,726 | 7/1994 | Thorne et al. | 43/124 |
| 5,555,672 | 9/1996 | Thorne et al. | 43/124 |
| 5,564,222 | 10/1996 | Brody | 43/124 |

*Primary Examiner*—Michael J. Carone
*Assistant Examiner*—Darren Ark
*Attorney, Agent, or Firm*—Raymond G. Areaux; Lisa Charouel

[57] ABSTRACT

The present invention is a simple, cost-effective, and inexpensive system and apparatus for detecting and monitoring the presence of wood-destroying insects, such as termites and which is transparent, and in an alternative embodiment, at least in part transparent. The present invention, unlike the prior art, has universal surface applicability in that the same apparatus may be used on a variety of surfaces, whether on the floor, the ceiling, the wall, or another surface. Additionally, the present invention is demountably mountable such that the present invention is removably attachable, and not permanently fixed, to the surface suspected of harboring wood-destroying insects. Further, the present invention relates to an apparatus for detecting the presence of wood-destroying insects by utilizing the apparatus alone, or in conjunction with a plug inserted into the suspect surface. The present invention utilizes a self-wicking moisture retaining bait material consisting of a highly preferred wood-destroying insect food and in the preferred embodiment of the present invention the bait material is comprised of tightly rolled corrugated paper sprinkled with pulverized dried okra.

19 Claims, 2 Drawing Sheets

SYSTEM AND APPARATUS FOR DETECTING AND MONITORING THE PRESENCE OF WOOD-DESTROYING INSECTS

BACKGROUND OF THE INVENTION

The present invention relates to a system and apparatus for detecting and monitoring the presence of wood-destroying insects. Wood-destroying insects, such as subterranean termites and formosan termites, cause more than $1.2 billion in damages annually in the United States alone. Utilizing a bait material consisting of a highly preferred wood-destroying insect food, the present invention provides a simple, and inexpensive system and apparatus for detecting the presence of wood-destroying insects.

More particularly, the present invention relates to an apparatus which is transparent, and in an alternative embodiment, at least in part transparent, for detecting the presence of wood-destroying insects. The present invention, unlike the prior art, has universal surface applicability in that the same apparatus may be used on a variety of surfaces, whether on the floor, the ceiling, the wall, or another surface. Additionally, the present invention is demountably mountable such that the present invention is removably attachable, and not permanently fixed, to the surface suspected of harboring wood-destroying insects. Further, the present invention relates to an apparatus for detecting the presence of wood-destroying insects by utilizing the apparatus alone, or in conjunction with a plug inserted into a suspect surface.

U.S. Pat. No. 5,329,726 to Thorne ("Pat. '726") discloses a system for termite detection and control which utilizes a transparent cartridge removably maintained within a housing. The housing of Pat. '726 is permanently implanted in the targeted terrain at or below ground level. Both the cartridge and the housing of Pat. '726 have multiple holes or perforations, which are in alignment with each other such that termites may enter the cartridge through the perforations in the housing. In order to determine whether termites are present, Pat. '726 teaches removing the cover from the housing, removing the cartridge from within the housing, inspecting the cartridge, followed by precisely replacing the cartridge within the housing, and replacing the cover to the housing.

As an alternative embodiment, Pat. '726 teaches using a pair of cylinders connected to the housing and having a plurality of sidewall perforations, which cylinders are externally mounted through a pair of holes drilled within a suspect surface. In this embodiment, the housing is fixedly mounted to the external surface of the targeted wooden structure. Again, detection of termites requires opening the housing, removing the cartridge from within the housing, inspecting the cartridge, precisely replacing the cartridge into the housing, and covering the housing.

The special and unique combination of features of the present invention improves upon Pat. '726 because the present invention requires minimal time to install, to operate, and later, to inspect for the presence of wood-destroying insects. The present invention does not require that the housing be permanently implanted in the ground or fixedly mounted on an exterior wall. In contrast to Pat. '726, the housing of the present invention is less invasive and less intrusive than the device disclosed in Pat. '726. To the extent that a more invasive technique is deemed necessary, the housing of the present invention maybe used in combination with a plug, which is inserted into a small hole drilled into the suspect surface. It is significant to note that the housing of the present invention may be utilized alone, or in combination with a plug, and thus is multi-functional.

Detecting the presence of wood-destroying insects, such as termites, using the present invention is much easier than Pat. '726. The housing of the present invention is at least in part transparent, and in an alternative embodiment, entirely transparent. An improvement over Pat. '726, a simple visual inspection determines whether any wood-destroying insects are present without requiring moving, removing, adjusting, or replacing the housing or any cartridge contained therein.

U.S. Pat. No. 5,285,688 to Robbins, et al. ("Pat. '688") discloses a system for detecting wood-destroying insect infestations in wood by sensing acoustic emissions generated by such wood-destroying insects as they feed. Pat. '688 teaches attaching an acoustic emissions sensor to the suspect area, electrically connecting the sensor to an amplifier and a processor, and generating a signal for indications of the presence of wood-destroying insects.

Unlike the present invention, Pat. '688 requires interpreting data to determine which signals result from background noise in the environment and which signals result from the feeding of wood-destroying insects. The present invention offers an improved simplified system, method, and apparatus for detecting the presence of wood-destroying insects over Pat. '688.

U.S. Pat. No. 5,005,416 to Vick, et al. ("Pat. '416") discloses insect detection using a pitfall probe trap apparatus having vibration detection capabilities. Pat. '416 relates to detection of insect infestation in agricultural commodities such as grain silos. Pat. '416 teaches an insect trap into which insects enter and are permanently entrapped.

An improvement over Pat. '416, the present invention allows for free insect mobility which aids in visual inspection of the present invention for the presence of wood-destroying insects. Additionally, the present invention offers an improved simplified system, method, and apparatus for detecting the presence of wood-destroying insects over Pat. '416.

U.S. Pat. No. 2,837,861 to Graham ("Pat. '861") discloses an outdoor insecticide container for exterminating insects. Pat. '861 discloses a hollow hemispherical cover which is removably attached to a base containing insecticide. The base of Pat. '861 is permanently attached to the ground by a peg extending from the center of the base. There are multiple perforations in the hemispherical cover and in the base of the device shown in Pat. '861.

The present invention improves upon Pat. '861 in having a housing which, at least in part, is transparent for ease of visual inspection for the presence of wood-destroying insects. Additionally, the moisture retaining features of the present invention aid in attracting, and thus detecting the presence of wood-destroying insects. Further, the present invention may be utilized inside as well as outside a residential home, a commercial business, or other structure.

U.S. Pat. No. 1,013,514 to Rand ("Pat. '514") discloses a poison receptacle for storing and handling poison while in use. Pat. '514 teaches concentric cylindrical containers separated by an absorbent material and having multiple perforations for access to the poison contained therein.

SUMMARY OF THE INVENTION

A primary object of the present invention is to provide a simple and cost-effective means for detecting and monitoring the presence of wood-destroying insects such as termites. The present invention illustrates an apparatus with universal surface application for wood-destroying insect detection on a vertical surface, a horizontal surface, or an angled surface. The present invention is demountably mountable, easily attached to a suspect surface for detection of wood-destroying insects, and, subsequently easily removed from the suspect surface. The apparatus of the present invention is multi-purpose and may be used alone, or in combination with a plug.

The present invention consists of a housing having a plurality of openings and containing a bait material. Additionally, the housing, at least in part, is transparent. The bait material preferably is comprised of tightly rolled corrugated paper sprinkled with pulverized dried okra.

It is significant to note that attachment of the present invention is substantially less intrusive (e.g., no digging holes for permanently implanting the housing or fixedly mounting the housing to an external surface) than the present methods. In most applications, the present invention is nondestructive to the surface which will be monitored (e.g., hanging the apparatus on an exposed stud). Additionally, the housing is plug-receivable. Thus, to the extent that a more invasive procedure is contemplated, the housing of the present invention may be connected to a plug which is inserted into a hole in the suspect surface.

The plug, preferably, is composed of bait material similar to that contained within the housing of the present invention. The housing of the present invention is plug receivable such that the plug connects to the housing and forms a contiguous surface or conduit allowing the wood-destroying insects to move easily from a suspect surface into the present invention. The plug is inserted into the housing and then inserted into a hole in a suspect surface which is of similar size and shape as the plug.

The present invention is made of one integral piece (excluding the plug), and thus is not meant to be reused. However, the present invention is made from external materials which are of a type having sufficient strength and durability to withstand extended use, such as plastic, plexiglass, glass or the like.

A manufacturing advantage is that the present invention may be made from products readily available. For example, the present invention may be made from a Solo® brand plastic drink lid, having holes punched therein, which is permanently mounted by a watertight seal to a plexiglass base also having holes punched therein.

An alternative embodiment of the present invention utilizes a toxic bait material instead of a nontoxic bait material. Thus, subsequent to the detection of wood-destroying insects, the nontoxic embodiment of the present invention could be replaced with the toxic embodiment of the present invention. As an additional alternative embodiment of the present invention, the nontoxic bait material could be inoculated with a substance poisonous to wood-destroying insects. If wood-destroying insects are detected, then such inoculation could be accomplished by use of a pipette or eye dropper to add the poisonous substance to the previously nontoxic bait material through an opening in the housing of the present invention.

In a further alternative embodiment of the present invention, the plug may be composed of toxic bait material similar to that contained within the housing of the present invention, or a poisonous substance may be applied to a plug composed of nontoxic bait material either before or after the detection of wood-destroying insects with the present invention.

There are many poisonous substances known in the art as toxic to wood-destroying insects. One example of such a poisonous substance is sulfluramid. Substances which are known in the art as toxic to wood-destroying insects, as well as those substances later proven to be toxic to wood-destroying insects, are encompassed by the present invention to the extent that such poisonous substances are capable of being incorporated into the wood-destroying insect preferred bait material of the present invention or of inoculating the wood-destroying insect preferred bait material of the present invention.

BRIEF DESCRIPTION OF THE DRAWINGS

With the foregoing and other objects in view, all of which more fully hereinafter appear, the present invention comprises certain constructions, combinations and arrangements of parts and elements as hereinafter described, defined in the appended claims and illustrated in the preferred embodiment in the accompanying drawings, in which:

DETAILED DESCRIPTION OF A PREFERRED EMBODIMENT

Figure 1:
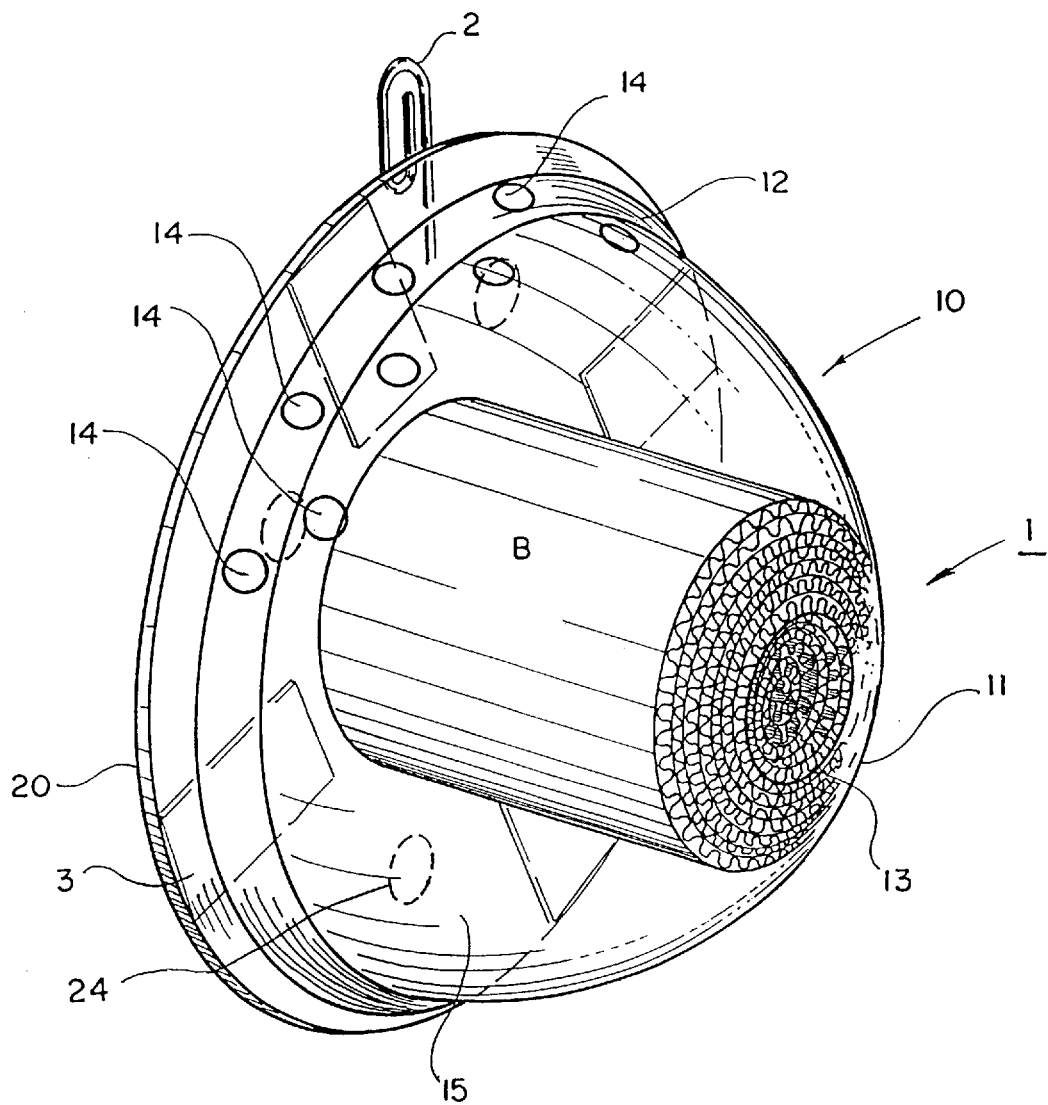
FIG. 1 is an overhead perspective of one embodiment of the present invention.
Figure 2:
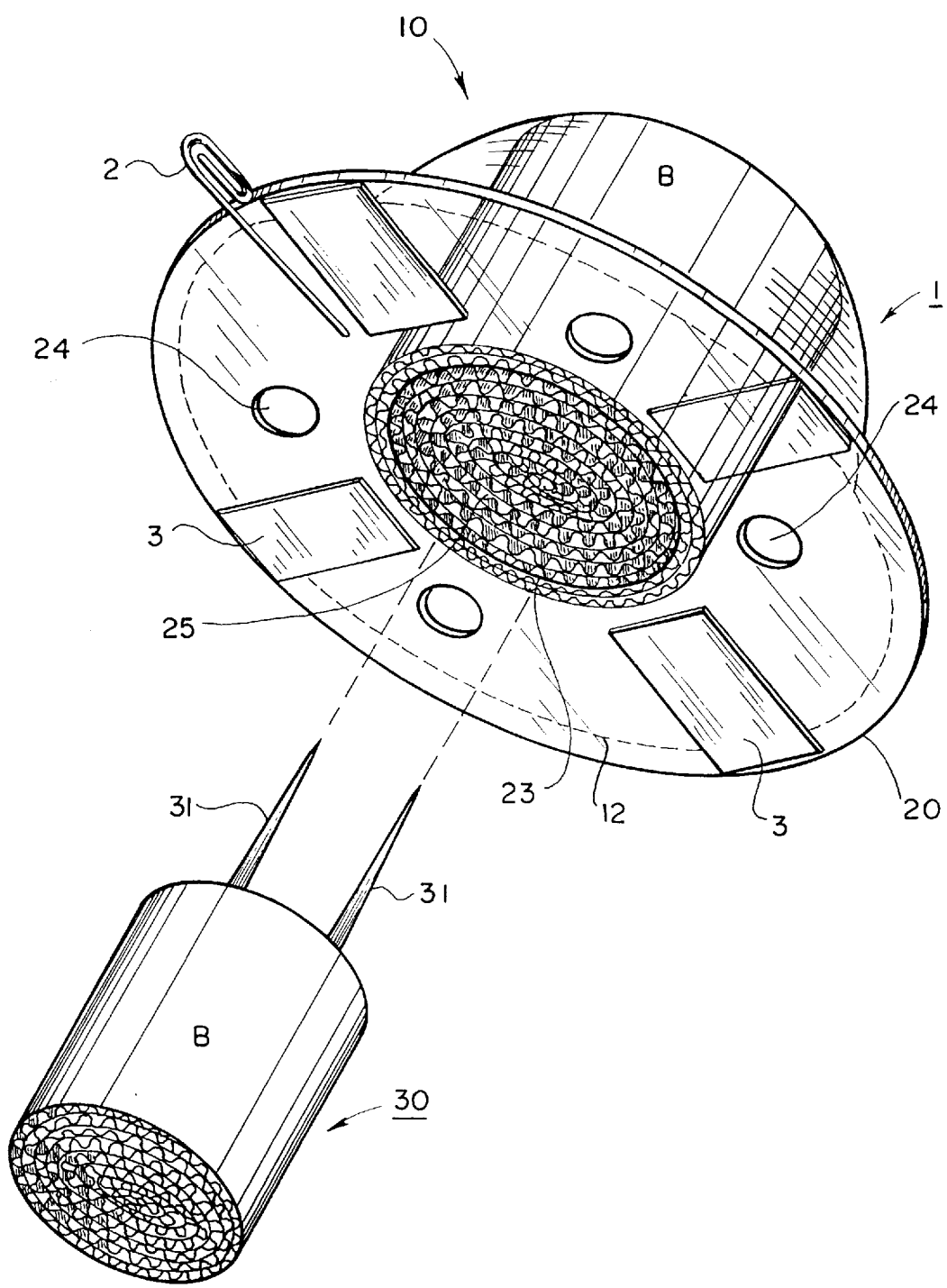
FIG. 2 is an underside exploded perspective view of an alternative embodiment of the present invention with the plug, showing the insertion point for the plug.

The preferred embodiments of the present invention, as illustrated in FIGS. 1 and 2, are comprised of housing 1 having top side 10 integrally attached to bottom side 20. Housing 1 is functionally transparent, at least in part, to allow inspection and viewing of the wood-destroying insects or infestation, and to allow monitoring of moisture within housing 1. Thus, housing 1 allows detection of wood-destroying insects such as termites by visual inspection. As shown in FIGS. 1 and 2, top side 10 of housing 1 is a hemispherical shell, having apex 11 and rim 12 along its largest circumference.

Housing 1 is demountably mountable on a suspect surface, such that housing 1 may be secured to, then easily removed from the suspect surface. Examples of demountably mountable securing means include hook 2, double stick tape 3, Velcro® ( brand adhesive strips, and liquid adhesives.

Housing 1 is nondestructive and non-intrusive. The present invention is an inexpensive device which may be used simply. Housing 1 may be placed on a suspect surface to detect the presence of wood-destroying insects. Once the present invention has served it purpose, housing 1 may be picked up and re-used elsewhere or disposed, as appropriate. If no wood-destroying insects are detected, then housing 1 may be moved to a new location. If wood-destroying insects are detected, then housing 1 may be disposed and replaced by new housing 1 containing toxic bait material B or, alternatively, bait material B may be inoculated with a substance poisonous to wood-destroying insects.

The universal surface applicable feature of housing 1 allows housing 1 to be mounted vertically, horizontally, or angularly. The present invention is flexible and versatile because housing 1 may be mounted in many different manners. Housing 1 may be hung on a suspect surface, such as an open stud or wall in an attic or in a basement, and then visually inspected periodically. Housing 1 may be placed on the bathroom floor either behind the toilet or under the tub, or similarly, on the kitchen floor under the sink. Housing 1 may be placed, upside-down, on a ceiling or ceiling beam. Housing 1 may be hung on an angled wall or post.

Alternatively, a hole may be drilled into a suspect surface, such as a wall or stud. After connecting plug 30 to housing 1, plug 30 is inserted into the drilled hole. Subsequent to insertion of plug 30 into the drilled hole, the present invention is visually inspected periodically for the presence of wood-destroying insects.

Top side 10 of housing 1 has at least one opening 13. Opening 13 may be located at apex 11 of top side 10, or alternatively, proximate to bottom side 20 along rim 12 (not shown). Opening 13 provides access to bait material B maintained within housing 1 to allow monitoring of moisture within housing 1 and to allow moistening of bait material B as needed.

In an alternative and equally preferred embodiment of the present invention, top side 10 consists of plurality of openings 14 in a semi-circular pattern proximate to bottom side 20 along rim 12. Plurality of openings 14 also provide access for monitoring of moisture within housing 1 and moistening of bait material B. Opposite plurality of openings 14 is reservoir 15. When fluid is added through plurality of openings 14, fluid is collected in reservoir 15, which maintains moisture within housing 1. Top side 10 of housing 1 may have either opening 13 or plurality of openings 14, or both (as shown in FIG. 1).

Bottom side 20 of housing 1 is a flat surface having at least one opening 23. Opening 23 provides access to bait material B maintained within housing 1 to allow wood-destroying insects to forage therein. In an alternative embodiment of the present invention, bottom side 20 further consists of plurality of openings 24. Plurality of openings 24 also provide multiple access points for wood-destroying insects to reach bait material B. Bottom side 20 of housing 1 may have either opening 23 or plurality of openings 24, or both (as shown in FIG. 2).

An additional element of an equally preferred embodiment of the present invention as shown in FIG. 2, is plug 30. Plug 30 may be combined with housing 1 to provide an access point between the interior of a suspect wall and bait material B contained within housing 1. In this equally preferred embodiment of the present invention, plug 30 is made of bait material B. A hole is drilled into a suspect surface. The hole corresponds in size and shape to plug 30, such that plug 30 fits complimentarily in the hole.

Plug 30 connects to housing 1 through plug receivable opening 25 in bottom side 20. Plug receivable opening 25 is complimentary in shape to plug 30. In this equally preferred embodiment of the present invention, spears 31 are fixed within plug 30 such that one end of the spears 31 remains exposed for complimentary insertion through plug receivable opening 25 and into bait material B contained within housing 1.

Spears 31 preferably are made of highly preferred wood-destroying insect food, such that feeding on, foraging into and burrowing into bait material B is encouraged. For example, spears 31, may be toothpicks, which easily are attached to plug 30 and which easily insert into bait material B contained within housing 1.

Maintained within housing 1 is self-wicking bait material B. The self-wicking properties of bait material B assist in maintaining and retaining moisture. Bait material B should be composed of highly preferred wood-destroying insect food, such as cellulose containing substances, which encourage feeding on bait material B, and thus reveal the presence of wood-destroying insects. Bait material B should be composed of material into which wood-destroying insects can easily burrow and devour. Such preferred composition properties allow for faster detection of the presence of wood-destroying insects in housing 1.

Such types of bait material B will encourage the wood-destroying insects to forage and burrow into bait material B. An excellent and preferred bait material B is tightly rolled corrugated paper. The most preferable bait material B, and the one used in the preferred embodiment of the present invention, is tightly rolled corrugated paper which is sprinkled with dried pulverized okra and slightly moistened.

An additional benefit, resulting from the use of tightly rolled corrugated paper as bait material B, is the self-wicking feature of the present invention. When sufficient water is added to housing 1 to fill reservoir 15, bait material B begins to moisten itself by wicking the water in reservoir 15. Once moistened with water, the tightly rolled corrugated paper retains water sufficient to maintain moisture within housing 1 as is preferred by wood-destroying insects such as termites. The tightly rolled corrugated paper also provides a simple and efficient means of connecting the plug 30 through plug receivable opening 25.

The moisture retention feature of the present invention results from (1) the placement of openings 13, and 14, of housing 1, and (2) the type of bait material B. The moisture retention feature is assisted by the addition of fluid, as necessary, through openings 13 and 14 of housing 1. Fluid, such as water, may be added using any small apparatus for holding and dispensing fluid, such as a syringe, a pipette, an eye dropper or the like.

Those skilled in the art will find it apparent that changes, modifications and variations can be made in the details of construction and the arrangement of components of the present invention described herein without departing from the spirit or scope of the invention or from the applicant's general inventive concept. Accordingly, it is to be understood that the present invention is not limited to the specific details and illustrative examples as shown and described, but the scope of the present invention is to be measured by the claims herein and equivalents thereof:

What is claimed is:

1. A wood-destroying insect detector system comprising:
   a housing defining an integral enclosure for enclosing therein a first self-wicking non-toxic bait material, wherein said housing comprises:
   a cover having a top, a bottom rim, a first side and a second side opposite said first side wherein said cover has formed at said top a top aperture, and wherein said cover has a side aperture formed along a bottom portion of said cover in close proximity to said bottom rim along said first side of said cover, and wherein said second side of said cover is a reservoir for collecting therein fluid for maintaining moisture in said housing when said housing is coupled to a vertical surface and wherein said top aperture and said side aperture provide direct access to said first non-toxic bait material, and
   a mountable base surface watertight sealed to said bottom rim of said cover wherein said mountable base surface has formed therein a centrally located aperture and a base aperture;
   a detachable second non-toxic bait material directly receivable in and directly couplable to a suspect surface; and,
   a spear having one end couplable in said detachable second non-toxic bait material and another end detachably receivable in said first self-wicking non-toxic bait material through said centrally located aperture wherein said second non-toxic bait material provides an access point between an interior of said suspect surface and said first non-toxic bait material.

2. The wood-destroying insect detector system of claim 1, wherein said first self-wicking non-toxic bait material and said second non-toxic bait material comprise a highly preferred wood-destroying insect food allowing feeding thereon, foraging therein, and burrowing therein.

3. The wood-destroying insect detector system of claim 2, wherein said first self-wicking non-toxic bait material and said second non-toxic bait material comprise rolled corrugated paper.

4. The wood-destroying insect detector system of claim 3, wherein said first self-wicking non-toxic bait material and said second non-toxic bait material further comprise pulverized dried okra.

5. The wood-destroying insect detector system of claim 2, wherein said spear is made of a third bait material.

6. The wood-destroying insect detector system of claim 1, wherein said first self-wicking non-toxic bait material and said second non-toxic bait material are adapted to be inoculated with a substance poisonous to wood-destroying insects.

7. The wood-destroying insect detector system of claim 1, further comprising a demountably mountable securing means for demountably mounting said mountable base surface to said suspect surface.

8. The wood-destroying insect detector system of claim 1, wherein said cover is hemispherically shaped and made of transparent material.

9. A wood-destroying insect detector system comprising:
a housing defining an integral enclosure for enclosing therein a first self-wicking non-toxic bait material, wherein said housing comprises:
a cover having a top, a bottom rim, a first side and a second side opposite said first side wherein said cover has formed at said top a top aperture, and wherein said cover has a side aperture formed along a bottom portion of said cover in close proximity to said bottom rim along said first side of said cover, and wherein said second side of said cover is a reservoir for collecting therein fluid for maintaining moisture in said housing when said housing is coupled to a vertical surface and wherein said top aperture and said side aperture provide direct access to said first non-toxic bait material for moistening said first non-toxic bait material, for inoculating said first non-toxic bait material with a toxic substance and to permit direct access by wood-destroying insects directly to said first non-toxic bait material, and
a mountable base surface watertight sealed to said bottom rim of said cover wherein said mountable base surface has formed therein a centrally located aperture and a base aperture;
a detachable second non-toxic bait material directly receivable in and directly couplable to a suspect surface; and,
a spear having one end couplable in said detachable second non-toxic bait material and another end detachably receivable in said first self-wicking non-toxic bait material through said centrally located aperture wherein said second non-toxic bait material provides an access point between an interior of said suspect surface and said first non-toxic bait material.

10. The wood-destroying insect detector system of claim 9, wherein said first self-wicking non-toxic bait material and said second non-toxic bait material comprise a highly preferred wood-destroying insect food allowing feeding thereon, foraging therein, and burrowing therein.

11. The wood-destroying insect detector system of claim 10, wherein said first self-wicking non-toxic bait material and said second non-toxic bait material comprise rolled corrugated paper.

12. The wood-destroying insect detector system of claim 11, wherein said first self-wicking non-toxic bait material and said second non-toxic bait material further comprise pulverized dried okra.

13. The wood-destroying insect detector system of claim 10, wherein said second non-toxic bait material is adapted to be inoculated with a substance poisonous to wood-destroying insects.

14. The wood-destroying insect detector system of claim 9, further comprising a demountably mountable securing means for demountably mounting said mountable base surface to said suspect surface.

15. The wood-destroying insect detector of claim 9, wherein said cover is hemispherically shaped and made of transparent material.

16. A method of detecting wood-destroying insects comprising the steps of:
a) providing a wood-destroying insect detector system comprising:
a housing defining an integral enclosure for enclosing therein a first self-wicking non-toxic bait material, wherein said housing comprises:
a cover having a top, a bottom rim, a first side and a second side opposite said first side wherein said cover has formed at said top a top aperture, and wherein said cover has a side aperture formed along a bottom portion of said cover in close proximity to said bottom rim along said first side of said cover, and wherein said second side of said cover is a reservoir for collecting therein fluid for maintaining moisture in said housing when said housing is coupled to a vertical surface and wherein said top aperture and said side aperture provide direct access to said first non-toxic bait material, and
a mountable base surface watertight sealed to said bottom rim of said cover wherein said mountable base surface has formed therein a centrally located aperture and a base aperture;
a detachable second non-toxic bait material directly receivable in and directly couplable to a suspect surface; and,
a spear having one end couplable in said detachable second non-toxic bait material and another end detachably receivable in said first self-wicking non-toxic bait material through said centrally located aperture wherein said second non-toxic bait material provides an access point between an interior of said suspect surface and said first non-toxic bait material;
b) mounting at least said housing of said wood-destroying insect detector system to said suspect surface;
c) moistening at least said first toxic bait material through either said top aperture, said centrally located plug receivable aperture, said side aperture or said base aperture; and,
d) visually inspecting said housing to detect wood-destroying insects.

17. The method of detecting wood-destroying insects of claim 16, further comprising the method step of:
e) upon detecting said wood-destroying insects, inoculating at least said first self-wicking non-toxic bait material with a toxic poisonous substance.

18. The method of detecting wood-destroying insects of claim 16, wherein the step of b) mounting at least said housing further comprises the steps of:

b1) mounting said detachable second non-toxic bait material in said suspect surface; and, b2) coupling said spear in said first self-wicking non-toxic bait material.

19. The method of detecting wood-destroying insects of claim 18, further comprising the method step of:

e) upon detecting said wood-destroying insects, inoculating said first self-wicking non-toxic bait material and said second non-toxic bait material with a toxic poisonous substance.

* * * * *

UNITED STATES PATENT AND TRADEMARK OFFICE
CERTIFICATE OF CORRECTION

PATENT NO. : 5,832,658
DATED : November 10, 1998
INVENTOR(S) : Donald G. Randon

It is certified that error appears in the above-identified patent and that said Letters Patent is hereby corrected as shown below:

Column 4, line 42, "Velcro® (" should read --Velcro®--; line 47, "it" should read --its--

Signed and Sealed this

Thirteenth Day of July, 1999

Attest:

Attesting Officer

Q. TODD DICKINSON

Acting Commissioner of Patents and Trademarks